May 22, 1962 H. R. POPE 3,035,352
WEIGHTED TAPE COMPASS
Filed Sept. 11, 1959 2 Sheets-Sheet 1

Harold R. Pope
INVENTOR.

May 22, 1962  H. R. POPE  3,035,352
WEIGHTED TAPE COMPASS
Filed Sept. 11, 1959  2 Sheets-Sheet 2
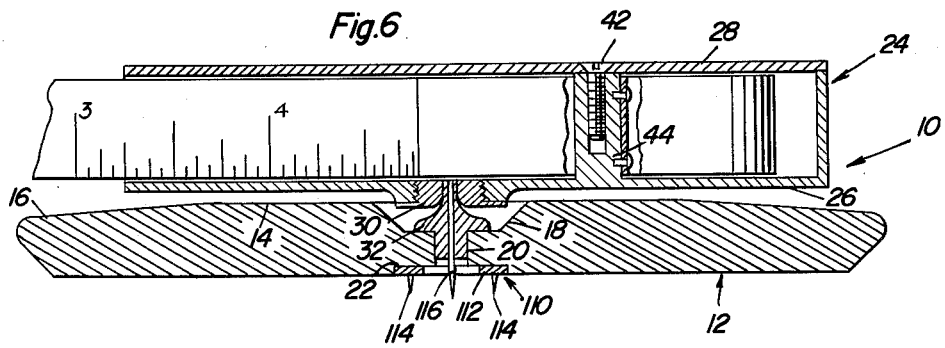
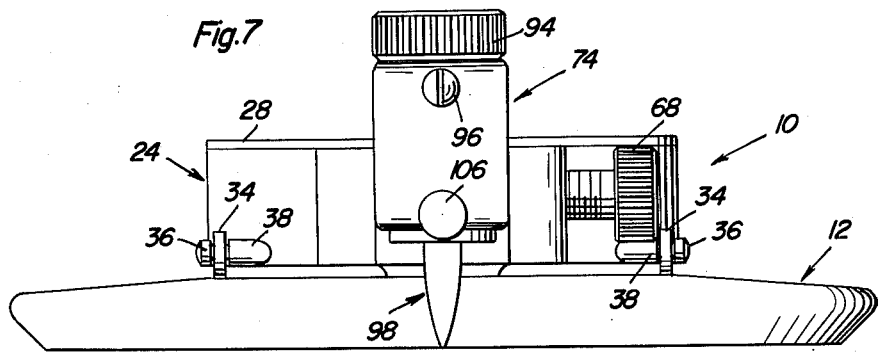
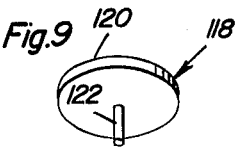
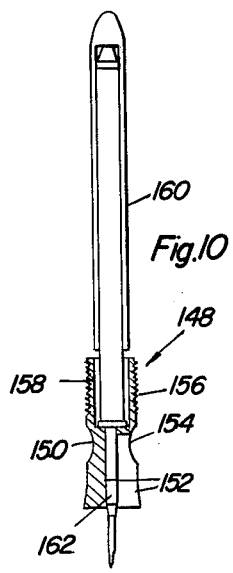
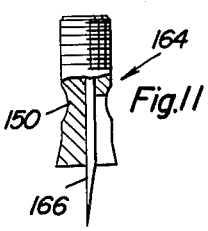
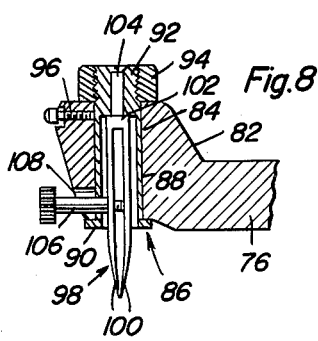
Harold R. Pope
INVENTOR.

# 3,035,352
WEIGHTED TAPE COMPASS
Harold R. Pope, Albuquerque, N. Mex.
(Carlsbad Housing, Apt. 61, Las Cruces, N. Mex.)
Filed Sept. 11, 1959, Ser. No. 839,480
4 Claims. (Cl. 33—27)

This invention relates in general to new and useful improvement in geometrical instruments, and more specifically to an improved tape compass.

An ordinary compass, as generally known to the public, is limited in the amount it can be opened and thusly is limited as to the radius of the circle which can be drawn therewith. It is, therefore, the primary object of this invention to provide a novel compass which utilizes a tape as a connecting link between the central support and the scribing head, the tape being carried by the central support and being adjustable in length so as to provide for variations in diameters of circles scribed.

Another object of this invention is to provide a compass which is so constructed that it may be positioned on any type of material, including wood, metal, and glass, as well as paper products, etc.

Still another object of the invention is to provide a novel compass, the compass being provided with a scribing head which is of a type which has interchangeable scribing units so that the compass may be selectively used for scribing a line with various types of scribers, or utilized as a cutter for materials such as paper and glass.

A further object of the invention is to provide a compass, the compass including a base which is relatively heavy and thus is stationary when positioned on a workpiece, the base supporting a body which is rotatably journalled on the base, and the body supporting a tape which is adjustable in length out of the body, and a scribing head carried by the tape remote from the body, the scribing head being movable relative to the body by pulling the tape therefrom, and the mounting for the body being relatively frictionless whereby the scribing head is moved at a point remote from the body, although the tape is flexible, the body will rotate with the scribing head with substantially no lag.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is an enlarged vertical sectional view taken substantially upon the plane indicated by the section line 6—6 of FIGURE 1 and shows the mounting of the tape and its specific details of the base;

FIGURE 7 is an elevational view of the compass as viewed from the scribing head end thereof;

FIGURE 8 is an enlarged fragmentary vertical sectional view taken substantially upon the plane indicated by the section line 8—8 of FIGURE 1 and shows the specific details of construction of the scribing head;

FIGURE 9 is an enlarged perspective view of a center which may be used in conjunction with the base when the compass is associated with metal;

FIGURE 10 is an enlarged elevational view with portions broken away and shown in section of a flat pencil scribing unit; and FIGURE 11 is an enlarged elevational view with portions broken away and shown in section of another form of pencil type scribing unit.

Figure 1:
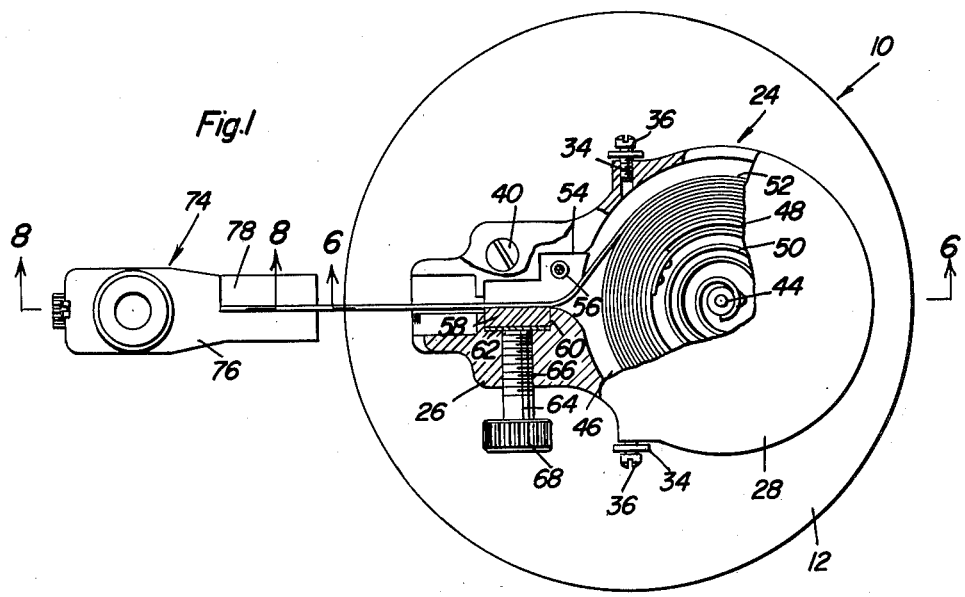
FIGURE 1 is a plan view of the compass with a portion of the body thereof broken away and shows the specific details of construction of the compass.

Referring now to the drawings, in detail, it will be seen that the compass is referred to in general by the reference numeral 10, the compass 10 includes a base 12 which is circular in outline, as is best shown in FIGURE 1. The compass 12 is preferably formed of a heavy metal, such as iron or steel, although other materials may be utilized in the construction thereof. As is best shown in FIGURE 6, the base 12 has a flat central upper portion 14 and a downwardly sloping outer upper portion 16. The upper part of the base 12 is also recessed as at 18 in the center thereof and a bore 20 extends through the center of the base 12. The bottom of the base 12 is also provided with a central recess 22.

A body, generally referred to by the numeral 24 is mounted on the base 12 for rotation relative thereto. The general configuration of the body 24 is best illustrated in FIGURE 1, the body 24 including a main frame 26 and a removable cover 28.

The main frame 26, as is best illustrated in FIGURE 6, is provided with a removable threaded insert 30 in the bottom thereof. The insert 30 has a pivot member 32 extending down therefrom, the pivot member 32 being seated in the recess 18 and having a portion extending down into the bore 20.

In order to prevent tilting or twisting of the body 24 with respect to the base 12, and thus binding the pivot member 32, suitable rollers 34 are provided. The rollers 34 are carried by the outer portion of the frame 26 and are supported by fasteners 36 which function as axles, the fasteners 36 being threaded into projections 38 on the exterior of the body frame 26. The rollers 34 engage an outer part of the upper surface 14, as is best shown in FIGURE 7. If desired, the rollers 34 may be replaced by suitable plastic slides.

The cover 28 is removable, the cover 28 being held in place on the body 26 by a pair of screws 40 and 42, the screw 42 being threadedly engaged into an upstanding post 44 on the frame 26, as is best illustrated in FIGURE 6. The post 44 is disposed centrally of a tape compartment 46, as is best shown in FIGURE 1.

A coil spring 50 is positioned within the compartment 46 and is disposed generally concentric about the post 44 with one end connected thereby. A flexible tape 52 is reeled about the exterior of the coil spring 50 and is secured thereto with the direction of reeling of the tape 52 being the same as the direction of the convolutions of the coil spring 50. Thus when the tape 52 is payed out, the coil spring 50 will be tightened so as to automatically urge the return of the tape 52. In this manner, the tape 52 is self-storing.

In order that the tape 52 may be retained in an extended position, the body 24 carries a fixed plastic clamp member 54 which is secured in place by means of a fastener 56. A second plastic clamp member 58, cooperates with the plastic clamp member 54. The plastic clamp member 58 is received in a recess 60 for movement towards the plastic clamp member 54. The clamp member 58 is backed by a backing plate 62 against which an end of the clamp screw 64 threadedly engaged in a bore 66 in spaced frame 26, bears. The clamp screw 64 is provided with a knurled head 68 to facilitate the adjustment thereof.

Figure 2:
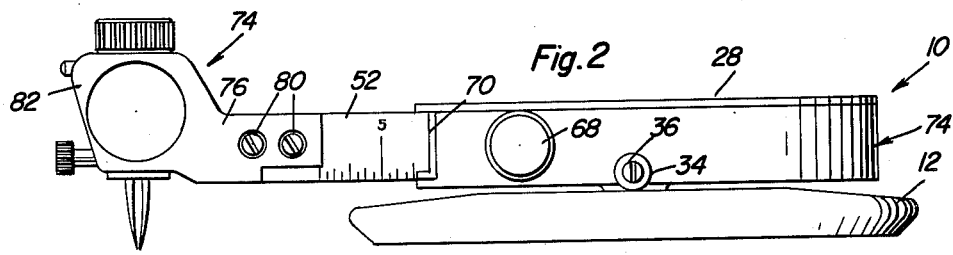
FIGURE 2 is an elevational view of the compass and shows the tape and the relationship of the tape with respect to the body so that the tape and scribing head carried thereby may be accurately positioned.

As is best illustrated in FIGURE 2, a portion of the base frame 26 is cut away as at 70. This provides a straight line lower portion 72 which will cooperate with the indicia on the tape 52 to facilitate the accurate positioning of the tape 52 with respect to the body 24.

A scribing head, generally referred to by the numeral 74, is carried by the free end of the tape 52. The scribing head 74, as is best illustrated in FIGURE 1, includes an elongated frame member 76 which has a portion 78 thereof removed. The portion 78 is in the form of a clamp block and is retained in place by a pair of fasteners 80 (FIGURE 2) which pass through the tape 52 and are threaded into the clamp block 78 so as to clamp the scribing head onto the tape 52.

The scribing head frame 76 has an upwardly offset outer end portion 82. This end portion is provided with a vertical bore 84 therethrough, as is best illustrated in FIGURE 8. A scribing unit is removably carried by the scribing head 74, the scribing unit passing through the bore 84. In FIGURES 2, 7 and 8, the scribing unit is in the form of an ink pin assembly and is generally referred to by the numeral 86. The scribing unit 86 includes a tubular support 88 having a peripheral flange 90 at the lower end thereof. The support 88 also includes a solid upper portion 92 which is externally threaded. The support 88 is passed through the bore 84 and the flange 90 thereof engages the underside of the scribing head frame 76. A retaining nut 94 is threadedly engaged on the upper part 92 of the support 88 to clamp the support 88 in place. The support 88 is prevented from rotating by a setscrew 96.

The scribing unit 86 includes a scribing element which is in the form of an inking pin, generally referred to by the numeral 98. The inking pin 98 includes a pair of spring ends 100 which are connected together as at 102 and which has a pin portion 104 extending upwardly therefrom and rigidly secured to the upper part 92 of the support 88. An adjusting screw 106 extends through the ends 100 to vary the spacing of the lower ends thereof. A suitable opening 108 is provided in the head 76 for the passage of the screw 106.

When the compass 10 is to be used on wood or other materials which may be easily penetrated, the base 12 is provided with a center insert generally referred to by the numeral 110. As best illustrated in FIGURE 6, the center insert 110 includes an annular ring 112 which is seated in the recess 22. A plurality of relatively short prongs 114 extend downwardly from the ring 112. Also, a center pin 116 extends down from the pivot member 32.

When the compass 10 is to be used on relatively hard materials, such as metal, it is necessary that a small diameter hole be drilled at the center for the compass. The center insert 118 is best illustrated in FIGURE 9 and includes a plate 120 having a pin 122 extending downwardly therefrom. The plate 120 is of a diameter to snugly fit in the recess 22.

Figures 3, 4, 4A, 5, 5A:
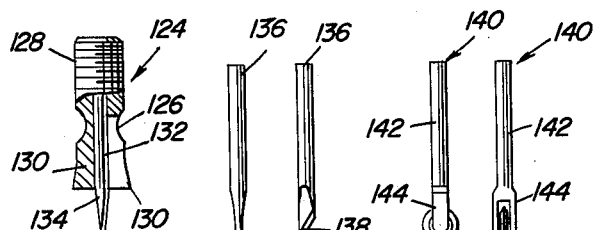
FIGURE 3 is an elevational view on an enlarged scale with portions broken away and shown in section of a scribing unit which may be used as a replacement for the scribing unit illustrated in FIGURE 2.
FIGURES 4 and 4a are elevational views showing the details of another form of scribing element.
FIGURES 5 and 5a are elevational views showing another form of scribing element.

Reference is now had to FIGURE 3 in particular wherein there is illustrated a modified form of scribing unit generally referred to by the numeral 124. The scribing unit 124 includes a chuck or collet 126 having a threaded upper portion 128. The lower portion of the collet 126 includes a plurality of segments 130 which are disposed about a central bore 132. A removable scribing element 134 is disposed within the bore 132. In this particular instance, the scribing element 134 is in the form of a scriber.

When the scribing unit 124 is inserted into the scribing head frame 76, as a replacement for the scribing unit 86, and the nut 94 is threaded onto the threaded portion 128, the segments 130 will be moved inwardly toward the center of the bore 132 and effectively clamp the scribing element 134 in place.

In FIGURES 4 and 4a a modified form of scribing element 136 is illustrated. The scribing element 136 is in the form of a knife and has a sharp edge 138. The knife is intended for the purpose of cutting cardboard, when it it desired to cut arcuate portions of a cardboard template, for example.

In FIGURES 5 and 5a there is illustrated another form of scribing element generally referred to by the numeral 140. The scribing element 140 includes an elongated shank 142 which terminates at the lower end thereof in a bifurcated portion 144 which supports a cutter wheel 146. The cutter wheel 146 is of the type utilized in cutting glass. It is to be understood that the scribing element 140 may be used in conjunction with the chuck or collet 126.

When the compass 10 is to be utilized in cutting glass, the scribing element 140 will replace the scribing element 134. The glass will be provided with a piece of masking tape or similar tape at the center thereof to provide a non-slip surface for the base 12. In this manner, the base 12 may be firmly anchored on the workpiece, even though the workpiece is in the form of a smooth material, such as glass.

Another form of scribing unit is illustrated in FIGURE 10 and is referred to in general by the reference numeral 148. The scribing unit 148 includes a chuck or collet 150. The collet 150 is provided at the lower portion thereof with a plurality of individual segments 152 disposed about a bore 154. It also has an externally threaded upper portion 156. The collet 150 differs from the collet 126 primarily in that the upper portion thereof is provided with a large diameter axial bore 158 and may be designed to perform the functions of the collet 124, if desired. The collet 150 is particularly adapted to support an adjustable pencil unit 160 of the type which dispenses lead. The bore 154 is rectangular in cross-section and the pencil 160 dispenses relatively flat lead 162.

Still another form of scribing unit is illustrated in FIGURE 11 and is generally referred to by the numeral 164. The scribing unit 164 includes the collet 150 and differs from the scribing unit 160 in that it merely includes a short section of lead 166 which is held in place solely by the collet 150. At this time it is pointed out that if it is desired to utilize round lead, then the round lead may be inserted into the collet 126 and would assume the general appearance of the scriber 134 illustrated in FIGURE 3.

From the foregoing, it will be readily apparent that there has been devised a highly desirable and novel compass which is of a construction that it may be utilized on any type of material and which is unlimited, within practical limitations, as to the diameter of circle which may be drawn therewith. Further, the scriber is provided with numerous types of replaceable scribing units so that it may be used for a multiplicity of purposes, including the cutting of materials, such as paper glass.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A weighted tape compass comprising, weighted base means having a bottom flat face, center pin anchoring means rotatably mounted in said base means and extending through said bottom surface, anchor pin insert means replaceably disposed within a recess in said bottom face for preventing angular displacement of the base means about the center pin anchoring means, carrier means fixed to said center pin anchoring means for rotation about the axis thereof relative to the base means, said carrier means mounting retractible tape means secured thereto on an axis offset from said center pin axis and laterally disposed clamp means mounted on the carrier means for engagement with said tape means on a side of the center pin axis opposite the tape mounting axis, spaced wheel means rotatably mounted by said carrier means for rotation about an axis intersecting the center pin axis and riding on a top surface of said base means and scribe means connected to a free end of the tape means.

2. The combination as defined in claim 1, wherein said clamp means includes a clamp element mounted on one side of the tape means for guiding the tape means for a radial extension from the carrier means and a friction lock element slidably mounted on said carrier means on an opposite side of the tape means and manually actuated control means connected to the lock element extending laterally from the carrier means above the base means.

3. A weighted tape compass comprising, weighted base means having a bottom flat face, center pin anchoring means rotatably mounted in said base means and extending through said bottom surface, anchor pin insert means replaceably disposed within a recess in said bottom face for preventing angular displacement of the base means about the center pin anchoring means, carrier means fixed to said center pin anchoring means for rotation about the axis thereof relative to the base means, said carrier means mounting retractible tape means secured thereto on an axis offset from said center pin axis and laterally disposed clamp means mounted on the carrier means for engagement with said tape means on a side of the center pin axis opposite the tape mounting axis, and spaced wheel means rotatably mounted by said carrier means for rotation about an axis intersecting the center pin axis and riding on a top surface of said base means.

4. The combination as defined in claim 3, wherein said clamp means includes a clamp element mounted on one side of the tape means for guiding the tape means for a radial extension from the carrier means and a friction lock element slidably mounted on said carrier means on an opposite side of the tape means and manually actuated control means connected to the lock element extending laterally from the carrier means above the base means.

References Cited in the file of this patent

UNITED STATES PATENTS

| | | |
|---|---|---|
| 577,472 | White | Feb. 23, 1897 |
| 1,045,300 | Lary | Nov. 26, 1912 |
| 1,298,585 | Sheppard | Mar. 25, 1919 |
| 2,062,157 | Benshimol | Nov. 24, 1936 |
| 2,428,310 | Hendry | Sept. 30, 1947 |
| 2,582,488 | Kroenlein | Jan. 15, 1952 |
| 2,624,117 | Paci | Jan. 6, 1953 |
| 2,627,662 | Taylor | Feb. 10, 1953 |
| 2,857,674 | Feldhake | Oct. 28, 1958 |

FOREIGN PATENTS

| | | |
|---|---|---|
| 273,105 | Great Britain | June 30, 1927 |